United States Patent [19]
Oiestad

[11] 3,899,099
[45] Aug. 12, 1975

[54] INERT GAS SYSTEM AND METHOD FOR TANKERS

[75] Inventor: Andrew Oiestad, Staten Island, N.Y.

[73] Assignee: Tank Sapp (UK) Ltd., Croydon, England

[22] Filed: June 21, 1973

[21] Appl. No.: 372,077

[52] U.S. Cl. ............... 220/88 B; 21/60.5 R; 55/37; 203/49; 210/1; 423/242
[51] Int. Cl.² ............... A62C 3/10; B01D 47/02; C01B 17/60
[58] Field of Search ............... 21/60.5 R; 220/88 B; 210/1; 55/37; 169/12; 423/242; 203/49

[56] References Cited
UNITED STATES PATENTS

| | | | |
|---|---|---|---|
| 3,389,829 | 6/1968 | Stanford | 21/60.5 R X |
| 3,556,722 | 1/1971 | Owaki | 423/242 |
| 3,781,407 | 12/1973 | Kamijo et al. | 220/88 B X |

OTHER PUBLICATIONS
Perry's Chemical Engineers' Handbook, 4th ed., 1963, p. 14–31.

Primary Examiner—Joseph Scovronek
Assistant Examiner—Barry I. Hollander
Attorney, Agent, or Firm—Amster & Rothstein

[57] ABSTRACT

Method and system for providing inert gas to prevent fires and explosions aboard tankers. A portion of the flue gas from the ship's boiler is scrubbed with sea water to remove sulfur dioxide. The scrubbed flue gas is then used as an inert gas blanket for the cargo tanks. The blanket of inert gas contains less than 12% oxygen and, therefore, combustion is prevented. For purposes of improved operation and ecology, the sulfur dioxide contained in the sea water is stripped therefrom before the sea water is discharged back into the sea.

5 Claims, 2 Drawing Figures

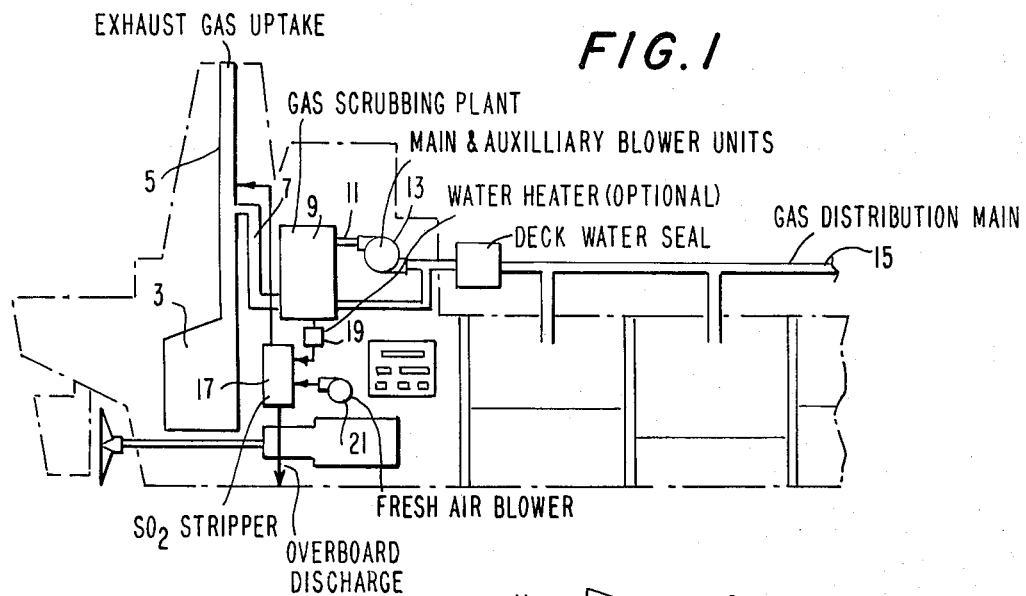
FIG. 1
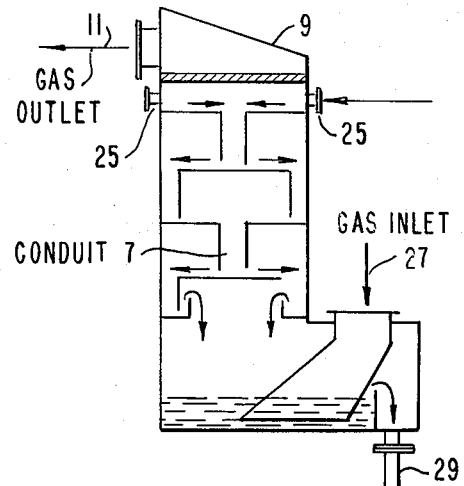
FIG. 2
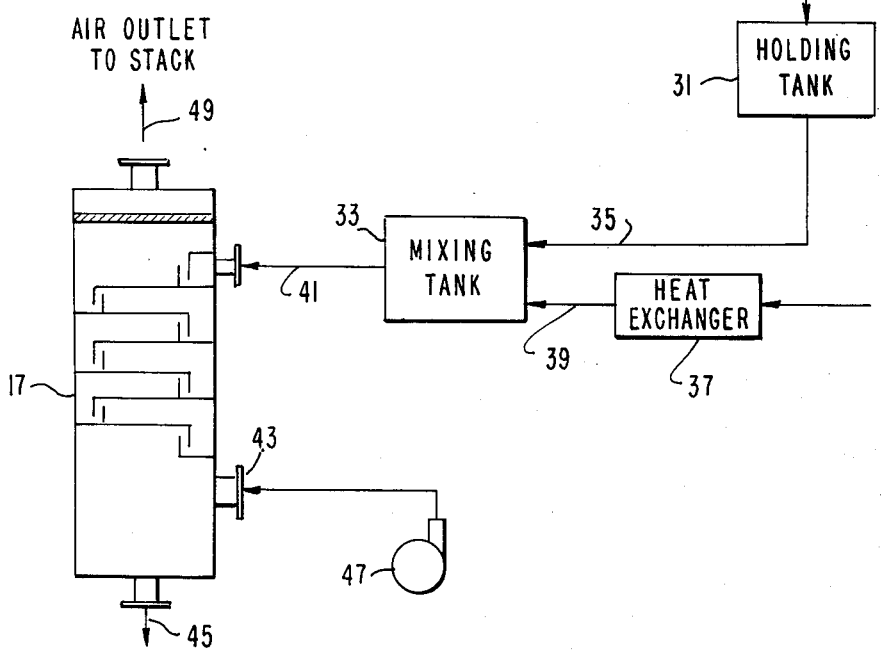

INERT GAS SYSTEM AND METHOD FOR TANKERS

This invention relates to a method and system for providing inert gas which is used to prevent fires and explosions aboard oil tankers, and more particularly relates to a method and system which provides an inert gas blanket for oil tanks without the necessity of discharging water containing sulfurous acid into the sea, thereby avoiding a significant water pollution problem.

One of the major difficulties facing designers and operators of tankers is the risk of explosion. This is expressed more accurately as rapid and uncontrolled combustion. To support such rapid combustion three elements must be present: fuel, ignition and oxygen. In tankers, fuel will always be present in the form of cargo and despite every care and choice of materials and equipment it is impossible to eliminate all sources of ignition, which includes static electricity, radio transmission, impact sparking, electrical faults, friction, spontaneous combustion, and even impossible human actions. There remains only the third factor, oxygen. To support combustion, a hydrocarbon/air mixture must have an oxygen content of at least 12% by volume. Atmospheric air contains oxygen in a concentration of 21% which makes it highly dangerous in tankers; but if the air is replaced by an inert gas system containing less than the critical 12% of oxygen, there can be no combustion.

In the inert gas systems which are currently used commercially, flue gas is extracted from the boiler uptakes and delivered to a gas cleaning and cooling device such as a scrubber. The flue gas bubbles up through the containers within the scrubber which contains sea water in order to remove dirt and water soluble sulfur compounds, particularly sulfur dioxide. Normally the gas will enter the scrubber at a temperature up to 650°F and in many of the systems the scrubber is designed to cool the gas to a temperature of approximately 90°F. The sea water cools the gas and also collects the water soluble dirt and sulfur compounds.

In the currently used systems, the sea water is introduced into the gas scrubber and is discharged from the unit through the drain piping into the ocean, bay or river, depending on the location of the vessel, thereby causing a serious pollution problem. The effluent scrubber water is acidic due to the absorption of sulfur dioxide gases present in the flue gas and has a pH of from 1.0 – 2.5. The absorbed sulfur dioxide reacts with the water to form sulfurous acid. In many commercial systems, the sulfurous acid in the effluent sea water is neutralized by adding sodium carbonate, sodium hydroxide, or lime to the water effluent. This method requires storage of large amounts of chemicals which presents problems at sea, and does not relieve the water pollution problem because the resulting compounds, for example, sodium sulphite, are also considered water pollutants.

The system and method of this invention completely eliminates the need for any chemical treatment of the sea water; pollutants are removed from the sea water effluent from the scrubber-cooler without the necessity of maintaining large storage facilities for chemicals aboard ship. The sulfur dioxide is scrubbed from the sea water with a sulfur dioxide stripping tower. which is included in the system. The sea water stripper is positioned so that the sea water rich in sulfur dioxide passes through it and the vaporous sulfur dioxide is removed and recycled to the stack of the boiler at a position above the point where flue gas is removed for the inert gas system.

The invention consists of a system and method as illustrated in the following drawings:

FIG. 1 is a schematic illustration showing the elements of this system and their relative positions aboard ship.

FIG. 2 is a schematic representation of the system including all the necessary and preferred elements.

The system and method disclosed herein includes the step of treating the effluent scrubber water under conditions which cause the disassociation of sulfur dioxide from the sea water. The sulfurous acid is broken down into water and sulfur dioxide by subjecting the contaminated sea water to the appropriate temperature and pressure.

FIG. 1 depicts the elements of the system and their relative position aboard ship. Flue gas is removed from the exhaust gas uptake 5 via conduit 7 and fed into the gas scrubber 9. Sea water is introduced into the gas scrubber to remove soot, dirt and water soluble sulfur compounds in the flue gas. The flue gas is discharged via conduit 11; and with the aid of the main and auxiliary blower units 13, is distributed through the gas distribution main 15 into the oil tanks. Suitable gas scrubbers are disclosed in U.S. Pat. No. 3,285,711.

The contaminated sea water effluent from the gas scrubber is introduced into the $SO_2$ stripper 17. In some instances, it may be desirable to heat the effluent prior to feeding it to the $SO_2$ stripper, in which case water heater 19 is provided. Fresh air is provided to the stripper via fresh air blower 21. The air containing the sulfur dioxide which is removed from the sea water is discharged to the exhaust gas uptake 5 at a point above the position where conduit 7 connects with the exhaust gas uptake.

FIG. 2 illustrates a gas scrubber in detail, shows the scrubber effluent holding tank, heat exchanger, and mixing tank in schematic form, and illustrates the stripping tower in detail. Shown in this drawing are the gas scrubber 9, sulfur dioxide stripping tower 17, mixing tank 33, holding tank 31, and heat exchanger 37. Flue gas drawn from the exhaust gas uptake via conduit 7 (shown in FIG. 1) is introduced into the scrubber cooler through gas inlet 27. The sea water coolant is introduced via conduit 25 near the top of the tower and contacts the gas in countercurrent fashion, thereby removing dirt and water soluble sulfur compounds. The gas which has been cleaned and cooled leaves the scrubber via conduit 11 and is introduced into the gas distribution main as shown in FIG. 1. The effluent from the scrubber-cooler passes via conduit 29 into a holding tank 31 which may optionally be employed. The effluent is then introduced directly into the stripping tower 17 or into mixing tank 33 via conduit 35 where it can be admixed with sea water which is heated in heat exchanger 37 and passes into mixing tank 33 via conduit 39. This is a preferred system because it adds flexibility to the operation. Alternatively, the effluent from the scrubber-cooler may be fed directly into the stripping tower 17.

The contaminated coolant is introduced into the sulfur dioxide stripper 17 via conduit 41. Fresh air is introduced into the stripper via inlet 43 with the aid of blower 47. The sulfur compounds are removed from the water and leave the stripper via outlet 49 then are vented to the atmosphere via exhaust gas uptake 5 (shown in FIG. 1). The water effluent from the sulfur dioxide stripper leaves the stripper via outlet 45 and is discharged into the sea.

The stripping tower is a countercurrent operation. The contaminated liquid sea water enters the top of the tower and flows downward and contacts the clean air in the trays provided in the tower. As is evident, the concentration of the sulfur dioxide in the liquid will be highest at the top of the tower and lowest at the bottom. Thus, for example, contaminated water between the top of the tower may contain 0.057 pounds of sulfur dioxide per 100 pounds of water and the fresh air which is introduced at ambient temperature will contain 0 pounds of sulfur dioxide; under these conditions the partial pressure of sulfur dioxide at the top tray would be approximately .5.7 millimiters of mercury and the total pressure is 14.7 psia. The concentration of sulfur dioxide in the outlet gas would be about $1.7 \times 10^{-2}$ pounds of sulfur dioxide per pound of air and the concentration of sulfur dioxide in the sea water effluent may be as low as 0.004 pounds of sulfur dioxide per hundred pounds of water.

The temperature of the water entering water inlets 25 in the scrubber should be in the range of from 40°F to 85°F. The rate of flow of water into the scrubber will depend upon the size of the system but in general it should be in the range of from 500 to 1000 gallons per minute. Flue gas entering gas inlet 27 is at atmospheric pressure and is introduced into the scrubber at a rate of from 10,000 to 20,000 standard cubic feet per minute. The temperature of this gas will generally be in the range of from 350° to 850°F. The gas leaving the scrubber via conduit 11 should be at a temperature of from 45°F to 90°F and will contain sulfur dioxide in an amount not greater than 60 parts per million.

The effluent sea water leaving the scrubber via conduit 29 should be at a temperature of from 90°F to 120°F.

The concentration of $SO_2$ in the effluent sea water entering the sulfur dioxide stripping tower 17 via conduit 41 should ordinarily be in the range of from 0.030 to 0.080 pounds of $SO_2$ per hundred pounds of water depending on the amount of sea water used for cooling and the concentration of $SO_2$ in the scrubber inlet inert gases. The temperature of the contaminated water entering the sulfur dioxide stripping tower should be in the range of from 90°F to 190°F preferably from 100°F to 140°F. Fresh air which is introduced via inlet 43 should be at a temperature of from 70°F to 500°F and the volume of air which is introduced should be within the range of from 5000 to 30,000 standard cubic feet per minute. The greater the number of the trays in the tower the greater the amount of separation. However, for the purposes of this invention, from 3 to 8 trays should be adequate. The clean water leaving outlet 45 will generally be at a temperature of from 70°F to 140°F and will contain sulfur dioxide in amounts no greater than 0.008 pounds per hundred pounds of water.

The gas leaving the scrubber via gas outlet 11 is suitable for use as a blanket to prevent fire and explosions in the tanks. The sulfur dioxide concentration is sufficiently low so that corrosion is kept to a minimum.

While certain preferred embodiments of the invention have been illustrated and described in detail, it is to be understood that changes may be made therein without departing from the scope and spirit of the invention disclosed herein. It is not, therefore, the intention to limit the patent to the specific constructions illustrated, but to cover the invention broadly in whatever form the principle may be utilized.

What is claimed is:

1. A system for providing a blanket of inert gas in cargo storage tanks of a tanker having a fuel burner using a sulfur-containing oil as a fuel, which comprises means for withdrawing a portion of the sulfur dioxide containing flue gas from said fuel burner, a scrubber-cooler, said scrubber-cooler having flue gas inlet means for admitting the portion of said flue gas withdrawn from said burner and flue gas outlet means for withdrawing the flue gas treated in said scrubber-cooler, said flue gas outlet means being connected to distribution means for distributing said treated flue gas to cargo storage tanks, coolant inlet means for admitting sea water coolant to said scrubber-cooler in countercurrent flow with said flue gas whereby said flue gas is cooled and sulfur dioxide is transferred from said flue gas to said sea water coolant, coolant outlet means for withdrawing said sea water coolant from said scrubber-cooler, stripping means to remove sulfur dioxide as a gas from the sea water coolant withdrawn from said scrubber-cooler, said stripping means including an air inlet and an outlet for discharge of gases to the atmosphere, conduit means interconnecting said coolant outlet means and said stripping means and means for discharging the sea water effluent from said stripping means into the water surrounding the tanker.

2. The system of claim 1 further including a mixing tank interposed between said coolant outlet means and said stripping means, said mixing tank including inlet means for said sea water coolant and inlet means for additional heated sea water.

3. In a process for providing an inert gas blanket to reduce the oxygen concentration in fuel oil storage tanks aboard ship to an amount not greater than about 12% by volume, wherein a flue gas containing sulfur dioxide is treated with sea water to reduce the sulfur dioxide concentration of said flue gas sufficiently to prevent the gas from causing corrosion of the storage tanks, the treated gas is distributed to the storage tanks aboard ship to provide an inert gas blanket, and the sea water used to remove the sulfur dioxide from the flue gas is discharged into the water surrounding the ship, the improvement comprising reducing the concentration of sulfur compounds in said water to a non-polluting level by contacting said water with a countercurrent stream of air in an amount and at a temperature sufficient to reduce the level of concentration of sulfur compounds to the desired level prior to discharging the sea water effluent to the water surrounding the ship.

4. A process according to claim 3 wherein the temperature of said countercurrent stream of air is from 70° to 500°F, the initial temperature of the water being treated by said air is from 90° to 190°F, and the temperature of the water discharged from the ship is from 70° to 140°F.

5. A process according to claim 3 wherein the concentration of sulfur compounds in the water discharged is reduced to a maximum of 0.008 pounds per 100 pounds of water prior to discharge from the ship.

* * * * *